US007431121B2

(12) United States Patent
Goguelet et al.

(10) Patent No.: US 7,431,121 B2
(45) Date of Patent: Oct. 7, 2008

(54) DRIVE SECTION OF A LIFT TRUCK

(75) Inventors: Eric Goguelet, Cenon-sur-Vienne (FR); Dominique Rousseau, Cenon-sur-Vienne (FR)

(73) Assignee: Linde Material Handling GmbH, Aschaffenburg (DE)

( * ) Notice: Subject to any disclaimer, the term of this patent is extended or adjusted under 35 U.S.C. 154(b) by 211 days.

(21) Appl. No.: 11/237,613

(22) Filed: Sep. 28, 2005

(65) Prior Publication Data

US 2006/0102778 A1 May 18, 2006

(30) Foreign Application Priority Data

Sep. 29, 2004 (DE) ....................... 10 2004 047 340

(51) Int. Cl.

*B60K 1/00* (2006.01)
*B60K 3/00* (2006.01)
*B60K 6/00* (2007.10)
*B60K 7/00* (2006.01)
*B60K 8/00* (2006.01)
*B60K 1/02* (2006.01)
*B60K 5/08* (2006.01)
*B62D 21/00* (2006.01)

(52) U.S. Cl. ...................... 180/291; 180/65.1; 180/312; 180/907; 180/908; 180/69.6

(58) Field of Classification Search ................ 180/65.1, 180/312, 907, 908, 291, 69.6
See application file for complete search history.

(56) References Cited

U.S. PATENT DOCUMENTS

| | | | | |
|---|---|---|---|---|
| 845,850 | A * | 3/1907 | Carter | 180/69.6 |
| 2,292,910 | A * | 8/1942 | Thornton | 74/473.2 |
| 2,318,726 | A * | 5/1943 | Wagner | 180/24.06 |
| 2,477,789 | A * | 8/1949 | Dunham | 180/291 |
| 2,745,505 | A * | 5/1956 | Nallinger | 180/69.6 |
| 3,957,128 | A * | 5/1976 | Le Salver et al. | 180/291 |
| 4,269,280 | A * | 5/1981 | Rosen | 180/69.6 |
| 6,991,051 | B2 * | 1/2006 | Swindell et al. | 180/65.1 |
| 2002/0000340 | A1 * | 1/2002 | Laimbock | 180/219 |

* cited by examiner

*Primary Examiner*—Christopher Ellis
*Assistant Examiner*—John R Olszewski
(74) *Attorney, Agent, or Firm*—The Webb Law Firm

(57) ABSTRACT

A drive section of an industrial truck has a vehicle frame (1), a drive unit (4) having a steerable drive wheel, and at least one pivoting roller (5, 6) located at a lateral offset in relation to the drive wheel (**4*d*). The vehicle frame (1), when viewed in the transverse direction of the drive section, has a first, centrally located mounting for the drive unit (4) and a second, laterally located mounting for the drive unit (4). Optionally, a drive unit (4) or a pivoting roller (5, 6) can be fastened to the mounting that is located to the side. The vehicle frame (1) has a mounting for a pivoting roller (5, 6) on the side opposite the lateral mounting for the drive unit (4**).

15 Claims, 1 Drawing Sheet

DRIVE SECTION OF A LIFT TRUCK

CROSS-REFERENCE TO RELATED APPLICATION

This application claims priority to German Application No. 10 2004 047 340.4 filed Sep. 29, 2004, which is herein incorporated by reference in its entirety.

BACKGROUND OF THE INVENTION

1. Field of the Invention

This invention relates to a drive section of a lift truck having a vehicle frame, a drive unit that has a steerable drive wheel, and at least one pivoting roller that is laterally offset from the drive wheel.

2. Technical Considerations

Drive sections of the above type are used in lift trucks of different designs and construction, for example in pallet trucks, high-lift trucks or low-lift order-picking trucks. The drive unit has a vehicle frame, an electrical drive unit with a drive wheel, at least one non-driven pivoting roller, as well as the complete electrical and hydraulic system of the lift truck.

Similar lift trucks of the known art conventionally have a single drive wheel which is part of an electrical drive unit. With regard to the arrangement and orientation of the drive unit, there are two different conventional designs and constructions.

In the first design, the drive unit is located to one side in the drive section. A non-driven pivoting roller is located on the other side of the drive section. The drive section therefore stands on the floor or roadway with a drive wheel on one side and a pivoting roller on the other side. A lift truck with a drive section of this type is called a four-wheel lift truck, wherein the number “four” is used because there are a drive wheel, a pivoting roller, and two load rollers.

In the second conventional design, the drive unit is located centrally in the drive section. A pivoting roller is located on each side of the drive section. The drive section therefore stands on the floor or roadway with a central drive wheel and two lateral pivoting rollers. A lift truck that is equipped with a drive section of this type is called a five-wheel lift truck.

The vehicle frames are conventionally adapted to meet the requirements of the different designs of the drive sections, and are thereby realized in different ways for the first design and for the second design. In a production plant for lift trucks, this results in a large number of different vehicle frames that have to be designed, manufactured, and kept in inventory.

Therefore, it is an object of the invention to provide a vehicle frame for lift trucks that can be used in drive sections of different modes of construction.

SUMMARY OF THE INVENTION

The invention teaches that the vehicle frame (viewed in the transverse direction of the drive section) has a first, centrally located mounting for the drive unit and a second, laterally located mounting for the drive unit. During installation and assembly, the drive unit can be fastened as necessary to the first, central mounting or to the second, lateral mounting. The same vehicle frame and the same drive unit can, therefore, be used for both models of lift truck. In the drive section of a four-wheel lift truck, the centrally located mounting remains unoccupied.

A drive unit or a pivoting roller can be fastened to the mounting located on the side, as appropriate. The installation site for the drive unit and the pivoting roller can be identical, although the drive unit and the pivoting roller can in fact be fastened to different parts of the vehicle frame. In a drive section of a four-wheel lift truck, a drive unit is fastened to the lateral mounting. On the drive unit of a five-wheel lift truck, a pivoting roller is fastened to the lateral mounting.

It is further appropriate if the vehicle frame has a mounting for a pivoting roller on the side opposite the lateral mounting for the drive unit. A pivoting roller is fastened to this mounting in any case, regardless of whether the drive section in question is part of a four-wheel lift truck or a five-wheel lift truck.

In another variant, on the side opposite the lateral mounting for the drive unit, the vehicle frame has a mounting to which a drive unit or a pivoting roller can be fastened, as appropriate. In this variant, in place of the lateral pivoting roller, a second drive unit can be fastened. It is thereby possible, using the same vehicle frame, to manufacture a drive section for a four-wheel lift truck with two drive units.

In one possible configuration, the vehicle frame has a rear wall plate that is oriented substantially vertically in the transverse direction of the drive section. Located on the rear wall plate are two reinforcement plates that are oriented in the longitudinal direction of the drive section. The drive section is between the reinforcement plates when the drive section is located centrally, and when the drive section is located laterally, it is located laterally with respect to the reinforcement plates. The rear wall plate forms the load-side termination of the drive section. The reinforcement plates are connected with the rear wall plate and extend into the interior of the drive section. The reinforcement plates thereby divide the width of the drive section into three sections of at least approximately equal width. Each of these areas offers sufficient space for a drive section or for a pivoting roller.

It is further advantageous if the frame has at least one mounting plate that is oriented substantially horizontally and on which the mountings for the drive units are located. The horizontal mounting plate is connected with the reinforcement plates and is used for, among other things, the fastening of the drive units.

BRIEF DESCRIPTION OF THE DRAWINGS

Additional advantages and details of the invention are explained in greater detail below with reference to the exemplary embodiment illustrated in the accompanying schematic drawings, in which like reference numbers identify like parts throughout.

DESCRIPTION OF THE PREFERRED EMBODIMENTS

Figure 1:
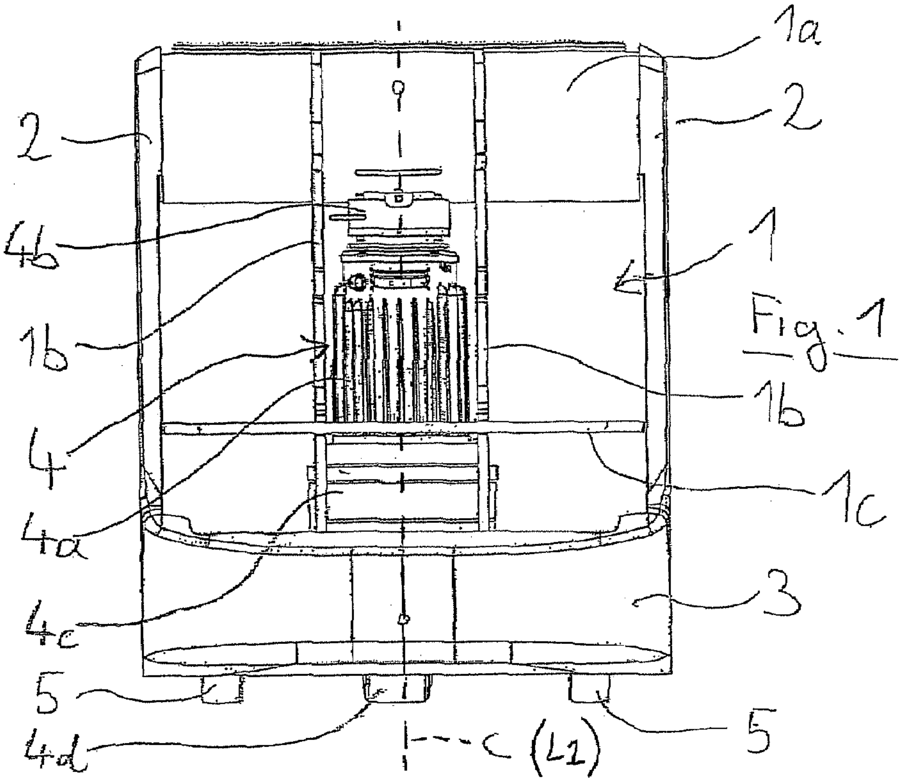
FIG. 1 shows a drive section of a five-wheel lift truck incorporating features of the invention.

The accompanying drawings show a drive section of a lift truck with a vehicle frame 1, two side panels 2, and a front panel 3. The vehicle frame 1 has a rear wall plate 1*a* that is oriented transversely, two reinforcement plates 1*b* that are oriented lengthwise, and one horizontal mounting plate 1*c*.

The mounting plate 1*c* has a plurality of mountings for a drive unit 4. There is one mounting between the two reinforcement plates 1*b* and an additional mounting between the reinforcement plate 1*b* shown on the right in the drawing and the right side panel 2. The mounting plate 1*c* can have a third mounting between the left reinforcement plate 1*b* in the drawing and the left side panel 2. The drive unit 4 comprises an electric motor 4*a*, a brake 4*b*, a transmission 4*c*, and a drive wheel 4*d*.

In the embodiment of the drive section for a five-wheel lift truck illustrated in FIG. 1, the drive unit 4 is fastened centrally to the vehicle frame 1, i.e., such that a centerline $L_1$ of the centrally mounted drive unit 4 is on the longitudinal centerline C of the frame 1. On the left side and on the right side of the drive section, there are respective pivoting rollers 5 which are realized in the form of non-driven casters and are also fastened to the vehicle frame 1.

Figure 2:
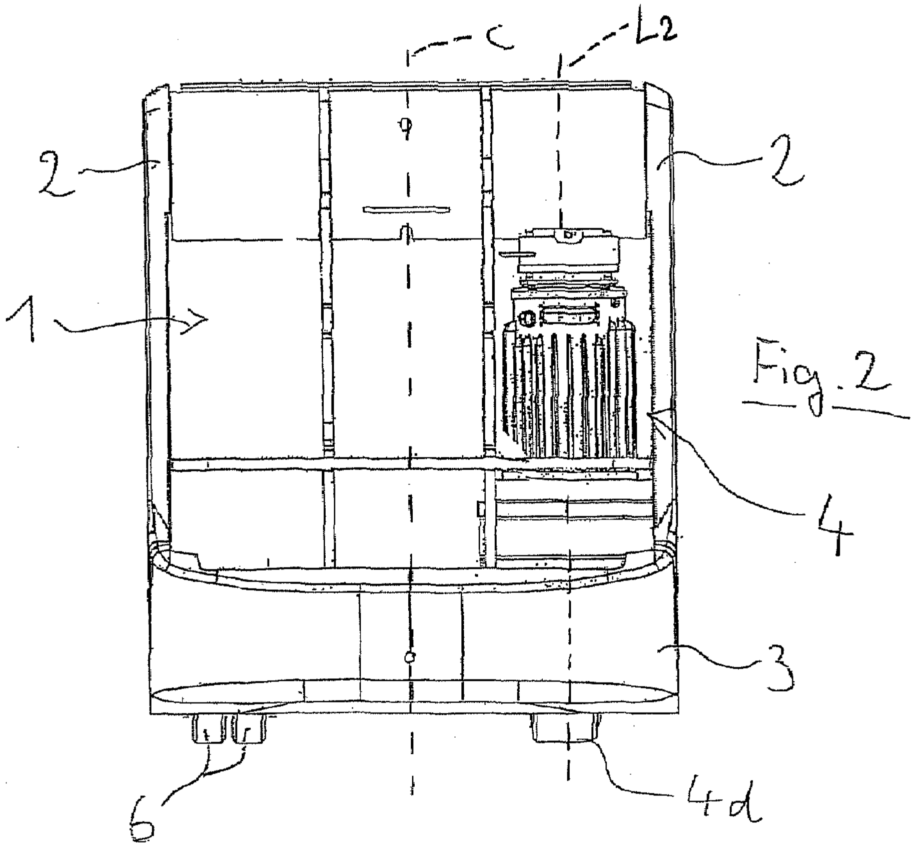
FIG. 2 shows a drive section of a four-wheel lift truck incorporating features of the invention.

FIG. 2 shows a drive section of a four-wheel lift truck. The vehicle frame 1 and the drive unit 4 are identical to the realization illustrated in FIG. 1, although the drive unit 4 is fastened to the vehicle frame 1 laterally, i.e., such that a centerline $L_2$ of the laterally mounted drive unit 4 is spaced from the longitudinal centerline C. On the opposite side of the drive section, there is a pivoting roller 6 which, in this example, is realized in the form of a twin roller and is also fastened to the vehicle frame 1.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A drive section of an industrial truck, comprising:

a vehicle frame having a longitudinal centerline; and a drive unit having a steerable drive wheel and at least one pivoting roller which is located at a lateral offset in relation to the drive wheel, wherein the vehicle frame, viewed in a transverse direction of the drive section, has a first, centrally located mounting for the drive unit such that a centerline of a centrally mounted drive unit is on the longitudinal centerline of the vehicle frame and a second, laterally located mounting for the drive unit such that a centerline of a laterally mounted drive unit is spaced from the longitudinal centerline of the vehicle frame.

2. The drive section as claimed in claim 1, wherein a drive unit or a pivoting roller can optionally be fastened to the laterally located mounting.

3. The drive section as claimed in claim 2, wherein the vehicle frame has a mounting for a pivoting roller on a side opposite the lateral mounting for the drive unit.

4. The drive section as claimed in claim 2, wherein the vehicle frame, on a side opposite the lateral mounting for the drive unit, has a mounting on which optionally a drive unit or a pivoting roller can be fastened.

5. The drive section as claimed in claim 2, wherein the vehicle frame has an upright rear wall plate that is oriented in a transverse direction of the drive section, wherein two reinforcement plates that are oriented in a longitudinal direction of the drive section are located on the rear wall plate, and wherein the drive section, when it is located centrally, is located between the reinforcement plates, and when it is located laterally is located alongside the reinforcement plates.

6. The drive section as claimed in claim 2, wherein the vehicle frame has at least one mounting plate that is oriented substantially horizontally, on which the mountings for the drive units are located.

7. The drive section as claimed in claim 1, wherein the vehicle frame has a mounting for a pivoting roller on a side opposite the lateral mounting for the drive unit.

8. The drive section as claimed in claim 7, wherein the vehicle frame has an upright rear wall plate that is oriented in a transverse direction of the drive section, wherein two reinforcement plates that are oriented in a longitudinal direction of the drive section are located on the rear wall plate, and wherein the drive section, when it is located centrally, is located between the reinforcement plates, and when it is located laterally is located alongside the reinforcement plates.

9. The drive section as claimed in claim 7, wherein the vehicle frame has at least one mounting plate that is oriented substantially horizontally, on which the mountings for the drive units are located.

10. The drive section as claimed in claim 1, wherein the vehicle frame, on a side opposite the lateral mounting for the drive unit, has a mounting on which optionally a drive unit or a pivoting roller can be fastened.

11. The drive section as claimed in claim 10, wherein the vehicle frame has an upright rear wall plate that is oriented in a transverse direction of the drive section, wherein two reinforcement plates that are oriented in a longitudinal direction of the drive section are located on the rear wall plate, and wherein the drive section, when it is located centrally, is located between the reinforcement plates, and when it is located laterally is located alongside the reinforcement plates.

12. The drive section as claimed in claim 10, wherein the vehicle frame has at least one mounting plate that is oriented substantially horizontally, on which the mountings for the drive units are located.

13. The drive section as claimed in claim 1, wherein the vehicle frame has at least one mounting plate that is oriented substantially horizontally, on which the mountings for the drive units are located.

14. A drive section of an industrial truck, comprising:

a vehicle frame; and a drive unit having a steerable drive wheel and at least one pivoting roller which is located at a lateral offset in relation to the drive wheel, wherein the vehicle frame, viewed in a transverse direction of the drive section, has a first, centrally located mounting for the drive unit and a second, laterally located mounting for the drive unit, wherein the vehicle frame has an upright rear wall plate that is oriented in a transverse direction of the drive section, wherein two reinforcement plates that are oriented in a longitudinal direction of the drive section are located on the rear wall plate, and wherein the drive section, when it is located centrally, is located between the reinforcement plates, and when it is located laterally is located alongside the reinforcement plates.

15. A drive section of an industrial truck, comprising:

a vehicle frame; and a drive unit having a steerable drive wheel and at least one pivoting roller which is located at a lateral offset in relation to the drive wheel, wherein the vehicle frame, viewed in a transverse direction of the drive section, has a first, centrally located mounting for the drive unit and a second, laterally located mounting for the drive unit, wherein the vehicle frame has an upright rear wall plate that is oriented in a transverse direction of the drive section, wherein two reinforcement plates that are oriented in a longitudinal direction of the drive section are located on the rear wall plate, wherein the drive section, when it is located centrally, is located between the reinforcement plates, and when it is located laterally is located alongside the reinforcement plates, and wherein the vehicle frame has at least one mounting plate that is oriented substantially horizontally, on which the mountings for the drive units are located.

* * * * *